Patented Mar. 4, 1947

2,416,745

UNITED STATES PATENT OFFICE 2,416,745

FERMENTATIVE GLYCEROL PRODUCTION

Ellis I. Fulmer and Leland A. Underkofler, Ames, Iowa, and Richard J. Hickey, Terre Haute, Ind., assignors to Iowa State College Research Foundation, Ames, Iowa, a corporation of Iowa No Drawing. Application December 13, 1941, Serial No. 422,920

12 Claims. (Cl. 195—38)

This invention relates to the production of glycerol and more particularly to a process for producing glycerol by the fermentation of sugars in an acid medium.

It has been known that when fermentable sugars are acted upon by yeasts, under normal acid conditions, the product includes primarily ethanol and carbon dioxide together with small amounts of glycerol and acetic acid. The quantity of glycerol produced in such a reaction is extremely small and such a process is, of course, entirely unsuitable for the commercial production of glycerol.

Two general methods, however, have been suggested for the production of glycerol by means of the fermentation of sugars. The first method is known as the "sulfite fixation" process. In this process a soluble sulfite is added to the fermentation mixture in sufficient quantity to produce fixation of acetaldehyde which is formed in the fermentation and thus to shift the equilibrium of the reaction to increase the quantity of glycerol which is formed. The other general method is known as the "alkaline fermentation" process wherein the fermentation is carried out in a medium made alkaline by the addition of alkaline salts or bases. Both of these processes are carried out in an alkaline medium which is unfavorable to the growth and action of yeasts and accordingly the yields have not been satisfactory.

Moreover, in both methods it is extremely difficult to separate the glycerol which is produced from the large quantities of soluble salts remaining in the medium after the reaction.

It has also been suggested that glycerol may be obtained in a sulfite fixation process wherein sulphur dioxide is added to the medium in order to fix the acetaldehyde. However, in this latter process the quantities of sulfur dioxide used to obtain satisfactory glycerol formation have been found to be toxic to the yeast.

We have found glycerol may be produced by the fermentation of fermentable sugars in a process in which the difficulties of the prior art have been eliminated and from which satisfactory commercial yields of the glycerol may be obtained. Our methods involve the fixation of the acetaldehyde formed in the fermentation reaction and the consequent shifting of the equilibrium of the reaction to form an increased quantity of glycerol. In our method, reagents are used which can be readily removed after the completion of the fermentation, either by filtration or by volatilization, leaving only relatively small quantities of salts remaining mixed with the glycerol which can then be separated without difficulty. Methods involving the fermentation of fermentable sugars with yeast in acid medium containing slightly soluble sulfites are set forth and claimed in our co-pending U. S. patent application, Serial No. 399,416, filed June 23, 1941, for Glycerol production, now Patent No. 2,388,840, issued November 13, 1945.

The present invention contemplates the fermentation of fermentable sugars with yeast in an acid environment in the presence of ammonium sulfite and ammonium bisulfite or either of these compounds. In the process of this invention, the conversion of the sugar into useful products, including glycerol, is practically complete, and the recovery of each of the products in relatively pure form is readily possible.

In accordance with the present invention a fermentable sugar such as dextrose is mixed with a fermenting organism, such as yeast, yeast nutrients as required and ammonium sulfite and ammonium bisulfite or either of these compounds. Any microorganism normally producing an alcoholic fermentation, the equilibrium of which may be altered to produce glycerol through fixation of acetaldehyde, may be used for the fermentation. For example, certain molds such as some species of genera Fusarium and Mucor can be used. Nevertheless, since the molds are much slower acting than the yeast and are more difficult to handle, yeast is to be preferred. The ingredients are mixed in a slightly acid aqueous medium under controlled conditions of temperature and acidity. As the fermentation proceeds, acetaldehyde and glycerol are produced in direct proportion to each other and ethanol is produced in quantities which are in inverse proportion to the quantities of acetaldehyde and glycerol.

The fermentation reaction is permitted to proceed in the presence of an excess of the ammonium sulfite or ammonium bisulfite until substantially all of the sugar has been fermented, at which time, the yeast may be removed from the medium and the products of the reaction may be separated.

In separating the products of the reaction, the mixture may be treated with a base such as calcium hydroxide to render the mixture alkaline. The mixture may then be subjected to distillation to remove therefrom ammonia, acetaldehyde and ethanol. The base will precipitate the sulfite from the mixture and the precipitate may be separated by filtration or centrifugation. If desired, any calcium remaining in the solution may then be precipitated by the addition of carbon dioxide. Preferably the carbon dioxide is added to a hot solution so as to avoid the formation of soluble calcium bicarbonate. Of course, the addition of the correct chemical equivalent of carbon dioxide will precipitate the calcium as the carbonate rather than as the bicarbonate even in cold solution.

When the mixture has been subjected to distillation and chemical treatment to remove the sulfite therein, the remaining mixture may be distilled to obtain the glycerol in relatively pure form or, if desired, the mixture may be recycled and used as the medium in a new reaction.

The raw material for our process is a fermentable sugar or mixture of such sugars, either in pure form or combined with other substances, as molasses, syrup, etc. For proper action by the yeasts it is necessary that the sugar be in solution. Concentrations of sugar as high as 25 g./100 ml. may be used, although more rapid fermentations will be obtained if the concentration does not exceed 20 g./100 ml. Weak concentrations unduly dilute the end products and make recovery difficult.

To the aqueous sugar solution is added an excess of ammonium sulfite, ammonium bisulfite, or a mixture of ammonium sulfite and ammonium bisulfite or ammonia and sulfur dioxide which combine in the solution to produce ammonium sulfite or ammonium bisulfite. Any desired proportion or mixture of these ingredients may be used. By an excess as the term is used herein is meant a sufficient quantity of the materials so that during the fermentation reaction, free ammonium sulfite or ammonium bisulfite will remain uncombined with the acetaldehyde. It is not necessary to add the entire quantity of sulfite or bisulfite at the beginning of the reaction. In fact, the sulfite and bisulfite are preferably added periodically as the process proceeds.

The excess of ammonium sulfite or ammonium bisulfite, of course, should not be sufficiently great to inhibit fermentation by reason of the toxic effects of the bisulfite ion on the yeast.

The sugar-sulfite mixture is inoculated with yeast. The quantity of yeast inoculum will vary with the conditions of the reaction and with the effect which the sulfite exerts upon the yeast. Since yeast is normally affected by the sulfite and its activity retarded, it is preferable to use in the fermentation reaction an acclimatized yeast.

By an acclimatized yeast is meant a yeast which is produced by inoculating a medium containing sugars and suitable yeast nutrients with yeast and, after fermentation has become active, an excess of ammonium sulfite is introduced into the mixture, being added in small quantities at periodical intervals for a period of several hours. In preparing the acclimatized yeast, the quantities of ammonium sulfite which are added at any one time should not be sufficient to markedly inhibit the fermentation. After the completion of the fermentation the yeast culture so formed is found to be resistant to the inhibiting action of the sulfite and may be used to inoculate a large batch of the fermentation medium in which the sugar fermentation for glycerol production is to be carried out.

The concentration of yeast or acclimatized inoculum in the sulfite-sugar solution may be varied within very broad limits since a variation of the concentration of the yeast will ordinarily only vary the rate of fermentation. The yeast or inoculum which is recovered at the end of the process may be used indefinitely to inoculate new batches of medium. Preferably, the fermentation is carried out at a temperature of approximately 30° C. since yeasts normally respond best at this temperature. However, the fermentation may be carried out at any temperature at which the yeasts are found to be active. During the fermentation reaction, the activity of the yeasts may be increased by continuous or intermittent stirring.

The acidity of the medium should be very carefully regulated in the fermentation reaction since the activity of the yeast and the control of the equilibrium of the reaction by means of which the glycerol is produced in substantial quantities are largely dependent upon the acidity of the medium.

The equilibrium of the reaction is affected by the fixation of the acetaldehyde. This fixation of the acetaldehyde is, in turn, dependent upon the concentration of the bisulfite ion in the medium, since the acetaldehyde forms with the bisulfite ion a complex radical or ion which shifts the equilibrium toward the increased formation of the glycerol and acetaldehyde. In a solution containing sulfite ion and bisulfite ion the concentration of the bisulfite ion is a function of the acidity or pH of the solution in accordance with the well established principles of mass action equilibrium. Accordingly, as the pH of the solution is lowered and the acidity of the solution is increased, the bisulfite ion concentration is increased while, on the other hand, a raising of the pH and a lowering of the acidity produces a decrease in the bisulfite concentration.

The bisulfite ion concentration in the medium should be sufficiently great to provide for the fixation of the acetaldehyde formed and thus produce a shifting of the equilibrium of the fermentation reaction. At the same time, if bisulfite ion is present in substantial quantities it exerts a toxic effect upon the yeast and its concentration, therefore, should not exceed a concentration at which the yeast is substantially unaffected, in a toxic manner, by the bisulfite ion.

The control of the acidity of the solution is important for additional reasons. It has been found that free ammonia is, to a certain extent, toxic to yeast and the maintaining of the medium in an acid condition is, therefore, desirable to avoid the formation and presence of free ammonia. An acid medium is also favorable to the growth of and fermentation by the yeast and is, therefore, to be additionally desired.

The solution should be maintained slightly acid at all times and is preferably maintained in the pH range between 6.0 and 7.0. The optimum pH is a function of the degree of acclimatization of the yeasts employed and hence it is not possible to give an exact rule for its determination.

One skilled in the art can very easily determine the optimum pH by making test fermentations employing the same constituents as the main process and varying the pH until the optimum value is found. For example, we have found that yeast grows satisfactorily at a pH range of between 6.5 and 6.9 in the presence of ammonium sulfite. As the fermentation reaction proceeds the pH of the medium will normally be found to vary somewhat. It is, therefore, desirable to use a pH regulator, for example, a Cameron pH recorder-controller of the conventional type to measure and adjust the pH of the medium continuously as the fermentation reaction proceeds. In regulating the pH of the solution or medium sulfur dioxide or sulfurous acid are preferably used to lower the pH of the solution by increasing the sulfite ion concentration therein. When the pH of the solution is to be raised, ammonia or ammonium hydroxide is preferably used to increase the alkalinity of the solution. When these substances are used to increase or decrease the acidity of the solution, no new ions are introduced into the solution and no additional problems in the separation of the end products of the reaction are created.

The ammonium sulfite is preferably added at periodical intervals since the initial presence of large quantities of ammonium sulfite tends to raise the pH of the medium and since the yeasts develop more rapidly if the medium does not contain excessive amounts of salts. As the fermentation proceeds and the acetaldehyde bisulfite complex is formed, the concentration of the free bisulfite ion in the medium decreases while the pH rises. The periodical addition of the sulfite salt tends to counteract this effect. Nevertheless, the pH should be carefully controlled and adjusted so as to maintain the same substantially constant throughout the fermentation reaction.

The fermentation reaction will ordinarily proceed to completion in between 18 and 72 hours, depending upon the conditions of the reaction. When substantially all of the sugar has been fermented, the precipitate of yeast may, if desired, be removed by any suitable method such as centrifugation or filtration. This yeast may be reused for inoculum for the fermentation of additional batches of sugar.

The fermentation mixture containing the yeast or from which the yeast has been removed, may be made alkaline by the addition of a slight excess of some alkaline substance, such as a hydroxide, oxide or carbonate of a metal of the alkaline earth group. Such a substance will react with the sulfite and precipitate them as insoluble compounds. Preferably, although not necessarily, the base may be calcium hydroxide.

Any suitable method for the isolation and purification of the components of alkaline mixture may be used. Preferably, the mixture is distilled to remove therefrom ammonia, ethanol and acetaldehyde. The distillation destroys the acetaldehyde-bisulfite complex and precipitates substantially all of the bisulfite as calcium sulfite. Since most of the slightly soluble sulfites are less soluble in hot solution than in cold, it is advantageous to filter out the sulfite precipitate while the solution is still hot. This filtration will also remove the yeast from the medium if it has not already been separated. The ammonia from the distillation may be recovered by any suitable or conventional method. The excess of the base such as calcium hydroxide is removed from the solution by introducing into the hot solution, carbon dioxide which will form an insoluble carbonate. The carbonate precipitate may then be removed from the solution by filtration. The remaining filtrate is a solution of glycerol containing very small amounts of soluble salts.

The filtrate containing the glycerol may be subjected to vacuum distillation or to treatment with a selective solvent or to other suitable means for separating the glycerol therefrom. If desired, the glycerol solution may be recycled and used as the medium in a succeeding operation, the sugar, inoculum, ammonium sulfite, etc. being added to the glycerol solution for this purpose. The same solution may be recycled in this manner for several times with an appreciable decrease in the rate of fermentation and with an appropriate increase in the glycerol concentration of the solution after each operation.

A specific example of a process embodying the invention is as follows: A medium is prepared containing, per liter, 150 g. of sugar (as dextrose), ammonium sulfite and/or ammonium bisulfite equivalent to about 60 g. of sulfur dioxide, and any necessary yeast nutrients. The yeast nutrients may suitably be supplied by addition of corn steep liquor and inorganic salts. If a raw material such as molasses, which contains some yeast nutrients, is used as a source of sugar, the additional nutrient requirement, if any, may be determined by experimentation. If pure sugars are used we have found that adequate yeast nutrients are supplied by the addition, per liter, of 2.0 to 4.5 g. of heavy corn steep liquor, 1.5 g. $NH_4Cl$, 0.75 g. $K_2HPO_4.3H_2O$, 0.75 g. $KH_2PO_4$; 0.2 g. $MgSO_4.7H_2O$ and 0.1 g. $CaCl_2$. The sulfite may be added as a solid salt or may suitably be prepared as required by the addition of requisite amounts of ammonia (or ammonium hydroxide) and sulphur dioxide (or sulphurous acid). The pH of the medium is adjusted to about 6.5 by addition of ammonium (or ammonium hydroxide) or sulphur dioxide (or sulphurous acid) as required and inoculated with an active yeast culture.

The yeast culture employed may consist of yeast cells filtered or centrifuged from a previous fermentation, or may be prepared as needed in the following manner: A culture of pure yeast is inoculated into a sterile medium containing 150 g. of sugar per liter and necessary yeast nutrients. After the fermentation has become active, portions of ammonium sulfite (as the solid or in concentrated solution) are added at intervals. The length of the intervals between the sulfite additions depends upon the activity of the fermentation. The amount of sulfite added at any one time and the intervals between the additions must be regulated so that active proliferation of the yeast and active fermentation is never interrupted. We have found that the addition of 5 g. portions of ammonium sulfite per liter at intervals of about 6 hours is generally satisfactory. At the end of 48 to 72 hours the acclimatized culture may be used to inoculate a batch of medium, prepared as stated above, for the main glycerol fermentation. A proportion of inoculum of one-tenth the volume of medium is suitable, although a greater or less proportion may be satisfactorily employed.

After inoculation the pH is maintained at the desired acid pH which may be at approximately 6.8 (most suitably by means of a pH recorder-controller such as the Cameron instrument, or other) using sulfur dioxide (or sulfurous acid). During the course of the fermentation the progress is followed by periodic sugar analyses and the fermentation is judged to be complete when no further reduction in sugar content is found. Upon completion of the fermentation, if it is desired to employ the yeast for inoculating a new batch of medium, this is separated by centrifugation or filtration. If the yeast is not to be so used, this step may be omitted.

To the fermented liquid calcium hydroxide in excess of the amount required to make the mixture distinctly alkaline is added, either as solid or as a slurry with water, and the mixture is agitated. The volatile materials are then removed by distillation, and the ammonia, acetaldehyde and ethanol are separated. The solids remaining after the distillation (calcium sulfite and excess calcium hydroxide) are removed by filtration or centrifugation. Calcium in solution is precipitated by adding carbon dioxide to the hot solution, and the resulting calcium carbonate removed by filtration or centrifugation. The glycerol remaining in the solution may then be recovered by suitable means, such as evaporation of the water followed by vacuum distillation or solvent extraction of the glycerol. Or, if it is desired, this solution may be recycled by the addition of more sugar, yeast nutrients, sulfite and yeast inoculum and the fermentation repeated. Such recycling may be practiced one or more times to build up the concentration of glycerol before its recovery, thus rendering the step of recovery more economical.

The control of the acidity of the medium during the fermentation reaction is extremely critical. By maintaining a relatively high pH in the acid medium or, in other words, by maintaining the medium in a slightly acid condition, the presence of excess quantities of bisulfite ions is avoided and the yeast is, therefore, not subjected to the toxic action of large quantities of bisulfite ion. At the same time, the maintaining of the pH below 7.0 eliminates any free ammonia which otherwise might be present in the medium and which is toxic to the yeast at least to a limited extent. The acid medium is also much more favorable to yeast growth and fermentation than is an alkaline medium.

The control of the pH of the medium is, therefore, important in the carrying out of the fermentation reaction.

The maintaining of the medium in an acid condition is also important in the shifting of the equilibrium of the fermentation reaction to obtain relatively large quantities of glycerol. In the absence of such a medium, bisulfite ion may not be formed in sufficient concentration to provide for the fixation of the acetaldehyde.

The bisulfite ion concentration in the medium is a critical factor in the fermentation reaction. At all times during the course of the fermentation reaction, bisulfite ion should be present in sufficient concentration to fix all of the acetaldehyde that is formed. On the other hand, the concentration of the bisulfite should be low enough to avoid any substantial inhibiting of the fermentation reaction by reason of the toxic effect of the bisulfite ion on the yeast or other fermenting organism. The maximum allowable concentration of bisulfite ion will, of course, vary with the degree of acclimatization of the fermenting organism and with the particular organism used.

The bisulfite ion concentration in the medium is affected by numerous factors. The concentration is increased with decreases in the pH of the medium and with increases in the sulfite ion concentration. The concentration of bisulfite ion also varies with the concentration of the acetaldehyde-bisulfite complex in the medium, as well as with the changes of temperature in the medium.

Accordingly, the conditions of the fermentation should be so controlled as to control the bisulfite ion concentration in the medium.

The fermentation may be carried out in a slightly acid medium in the presence of bisulfite ion in a quantity sufficient to fix the acetaldehyde and insufficient to have a toxic effect upon the fermenting organism. The medium is preferably maintained at a pH of between 6.0 and 7.0 and is adjusted to maintain the pH of the medium substantially constant as the fermentation proceeds.

The fermentation reaction may be carried out in the presence of bisulfite ion in a medium wherein the acidity is carefully controlled. Although the bisulfite ion may be obtained from various sources, it is preferably provided by adding ammonium sulfite or ammonium bisulfite to the medium.

Although the process of the invention has been described in relation to particular conditions and ingredients, it will be understood that these have been given for the purpose of illustration. Changes and variations in the process, therefore, and particularly in the quantities and proportions of the ingredients and in the conditions of the reactions may readily be made without departing from the spirit and scope of the invention.

We claim:

1. In a process for the production of glycerol the step of fermenting a fermentable sugar in a slightly acid medium containing a substance selected from the group consisting of ammonium sulfite and ammonium bisulfite, said substance being present in a quantity sufficient to fix the acetaldehyde formed in the fermentation and insufficient to substantially inhibit the fermentation reaction.

2. In a process for the production of glycerol the step of fermenting a fermentable sugar in a slightly acid medium having a pH of between 6.0 and 7.0 and containing a substance selected from the group consisting of ammonium sulfite and ammonium bisulfite, said substance being present in a quantity sufficient to fix the acetaldehyde formed in the fermentation and insufficient to substantially inhibit the fermentation reaction.

3. In a process for the production of glycerol the step of fermenting a fermentable sugar in a slightly acid medium containing a substance selected from the group consisting of ammonium sulfite and ammonium bisulfite, said substance being present in a quantity in excess of that sufficient to fix the acetaldehyde formed in the fermentation.

4. In a process for the production of glycerol the step of fermenting a fermentable sugar with yeast in a slightly acid medium having a pH between 6.0 and 7.0 and containing a substance selected from the group consisting of ammonium sulfite and ammonium bisulfite, said substance being present in a quantity sufficient to fix the acetaldehyde formed in the fermentation and insufficient to substantially inhibit the fermentation reaction.

5. In a process for the production of glycerol the steps of mixing a fermentable sugar, an acclimatized yeast organism, a yeast nutrient, and a substance selected from the group consisting of ammonium sulfite and ammonium bisulfite in an aqueous medium having a pH in the range between 6.0 and 7.0, said substance being present in a quantity in excess of that sufficient to fix the acetaldehyde formed in the fermentation, and adjusting the pH of the medium to maintain the same in said range while fermentation occurs, the pH being increased by increasing the sulfite ion concentration in the medium and the pH being decreased by increasing the ammonium ion concentration in the medium.

6. In a process for the production of glycerol the steps of fermenting a fermentable sugar with yeast in a slightly acid medium containing a substance selected from the group consisting of ammonium sulfite and ammonium bisulfite, said substance being present in a quantity in excess of that sufficient to fix the acetaldehyde formed in the fermentation, periodically adding to the medium a substance selected from the group consisting of ammonium sulfite and ammonium bisulfite, and maintaining the pH of the medium substantially constant and the medium slightly acid throughout the fermentation.

7. In a process for the production of glycerol the steps of fermenting a fermentable sugar with yeast in a slightly acid medium having the pH in the range between 6.0 and 7.0 and containing a substance selected from the group consisting of ammonium sulfite and ammonium bisulfite, said substance being present in a quantity in excess of that sufficient to fix the acetaldehyde formed in the fermentation, periodically adding to the medium a substance selected from the group consisting of ammonium sulfite and ammonium bisulfite, and adjusting the pH of the medium to maintain the same in said range while fermentation occurs, the pH being increased by increasing the sulfite ion concentration in the medium and the pH being decreased by increasing the ammonium ion concentration in the medium.

8. In a process for the production of glycerol, the steps of fermenting a fermentable sugar with yeast in a slightly acid aqueous medium containing a substance selected from a group consisting of ammonium sulfite and ammonium bisulfite, said substance being present in a quantity sufficient to fix the acetaldehyde formed in the fermentation and insufficient to substantially inhibit the fermentation reaction adding to the fermented medium a cation which combines with the sulfite ion to form a substance of low solubility, and separating said substance from the medium.

9. In a process for the production of glycerol, the steps of fermenting a fermentable sugar with yeast in a slightly acid aqueous medium containing a substance selected from a group consisting of ammonium sulfite and ammonium bisulfite, said substance being present in a quantity sufficient to fix the acetaldehyde formed in the fermentation and insufficient to substantially inhibit the fermentation reaction adding to the fermented mixture a base having a cation which combines with the sulfite ion to form a substance of low solubility, subjecting the fermented mixture to distillation, and separating the precipitate from the medium.

10. In a process for the production of glycerol, the steps of fermenting a fermentable sugar with yeast in a slightly acid medium having a pH between 6.5 and 6.9 and containing a substance selected from the group consisting of ammonium sulfite and ammonium bisulfite, said substance being present in a quantity in excess of that sufficient to fix the acetaldehyde formed in the fermentation, precipitating the sulfite ion by adding to the medium a substance selected from the group consisting of hydroxides, oxides and carbonates of metals of the alkaline earth group, subjecting the fermented mixture to distillation to remove therefrom ammonia, acetaldehyde and ethanol, separating the precipitate from the medium, and adding carbon dioxide to the medium to precipitate as calcium carbonate any soluble calcium remaining in the medium.

11. In a process for the production of glycerol, the steps of fermenting a fermentable sugar with yeast in a slightly acid aqueous medium having a pH in the range between 6.5 and 6.9 and containing a substance selected from the group consisting of ammonium sulfite and ammonium bisulfite, said substance being present in a quantity sufficient to fix the acetaldehyde formed in the fermentation and insufficient to substantially inhibit the fermentation reaction, adjusting the pH of the medium to maintain the same in said range throughout the fermentation, adding to the mixture a substance selected from the group consisting of hydroxides, oxides and carbonates of metals of the alkaline earth group to precipitate the sulfite ion in the medium, subjecting the fermented mixture to distillation to remove therefrom ammonia, acetaldehyde and ethanol, and separating the precipitate from the medium.

12. In a process for the production of glycerol wherein a fermentable sugar is mixed with a fermenting organism for producing alcoholic fermentation of said sugar, the steps of mixing with the sugar and fermenting organism a substance selected from the group consisting of ammonium sulfite and ammonium bisulfite in a slight acid medium and adjusting the pH of the medium to maintain the same substantially constant and the medium slightly acid while fermentation occurs, said substance being present in a quantity sufficient to fix the acetaldehyde formed in the fermentation and insufficient to substantially inhibit the fermentation reaction.

ELLIS I. FULMER.
LELAND A. UNDERKOFLER.
RICHARD J. HICKEY.

REFERENCES CITED

The following references are of record in the file of this patent:

UNITED STATES PATENTS

| Number | Name | Date |
| --- | --- | --- |
| 1,425,838 | Cocking et al. | Aug. 18, 1922 |
| 1,987,260 | Lilly | Jan. 8, 1935 |
| 1,990,908 | Krug | Feb. 12, 1935 |

FOREIGN PATENTS

| Number | Country | Date |
| --- | --- | --- |
| 349,192 | British | May 28, 1931 |
| 278,086 | British | Sept. 30, 1927 |
| 488,464 | British | July 7, 1938 |

OTHER REFERENCES

Prescott et al., "Industrial Microbiology," 1940, page 163 (Copy in Division 63).